United States Patent [19]

Itatani et al.

[11] 4,262,768
[45] Apr. 21, 1981

[54] POWER TRANSMISSION SYSTEM FOR TRACTOR

[75] Inventors: Hiroshi Itatani; Kenji Matsuda, both of Sakai; Tadao Terahigashi, Moriguchi; Etsuzi Kisita, Sakai; Masatugu Tone, Hashimoto, all of Japan

[73] Assignee: Kubota, Ltd., Osaka, Japan

[21] Appl. No.: 942,149

[22] Filed: Sep. 14, 1978

[30] Foreign Application Priority Data

Jan. 31, 1978 [JP] Japan .................................. 53-10938
Feb. 6, 1978 [JP] Japan .................................. 53-12798

[51] Int. Cl.³ ........................ B60K 17/28; B60K 17/34
[52] U.S. Cl. ..................................... 180/242; 74/15.6; 180/53 R
[58] Field of Search .............. 180/53 R, 14 D, 44 M, 180/44 F; 74/15.63, 15.6, 242, 243

[56] References Cited

U.S. PATENT DOCUMENTS

| | | | |
|---|---|---|---|
| 3,185,241 | 5/1965 | Jackson | 180/53 R |
| 3,196,696 | 7/1965 | Ritter | 74/15.63 |
| 3,701,393 | 10/1972 | Lemons | 180/53 R |
| 3,817,341 | 6/1974 | Greene | 180/14 D |
| 3,833,079 | 9/1974 | Gego | 180/44 F |
| 3,994,353 | 11/1976 | Greene | 180/44 M |

FOREIGN PATENT DOCUMENTS 1079874 4/1960 Fed. Rep. of Germany .
1897769 4/1964 Fed. Rep. of Germany .

Primary Examiner—John A. Pekar
Attorney, Agent, or Firm—Haseltine and Lake

[57] ABSTRACT

A power transmission system for a tractor comprising a hydraulic pump, a hydraulic motor to be driven by the oil forced out from the pump, a PTO transmission mechanism coupled to the shaft of the hydraulic pump and a wheel transmission mechanism coupled to the output shaft of the hydraulic motor. The power from an engine is transmitted to the PTO transmission mechanism by way of the pump shaft before being delivered to the wheel transmission mechanism.

5 Claims, 7 Drawing Figures

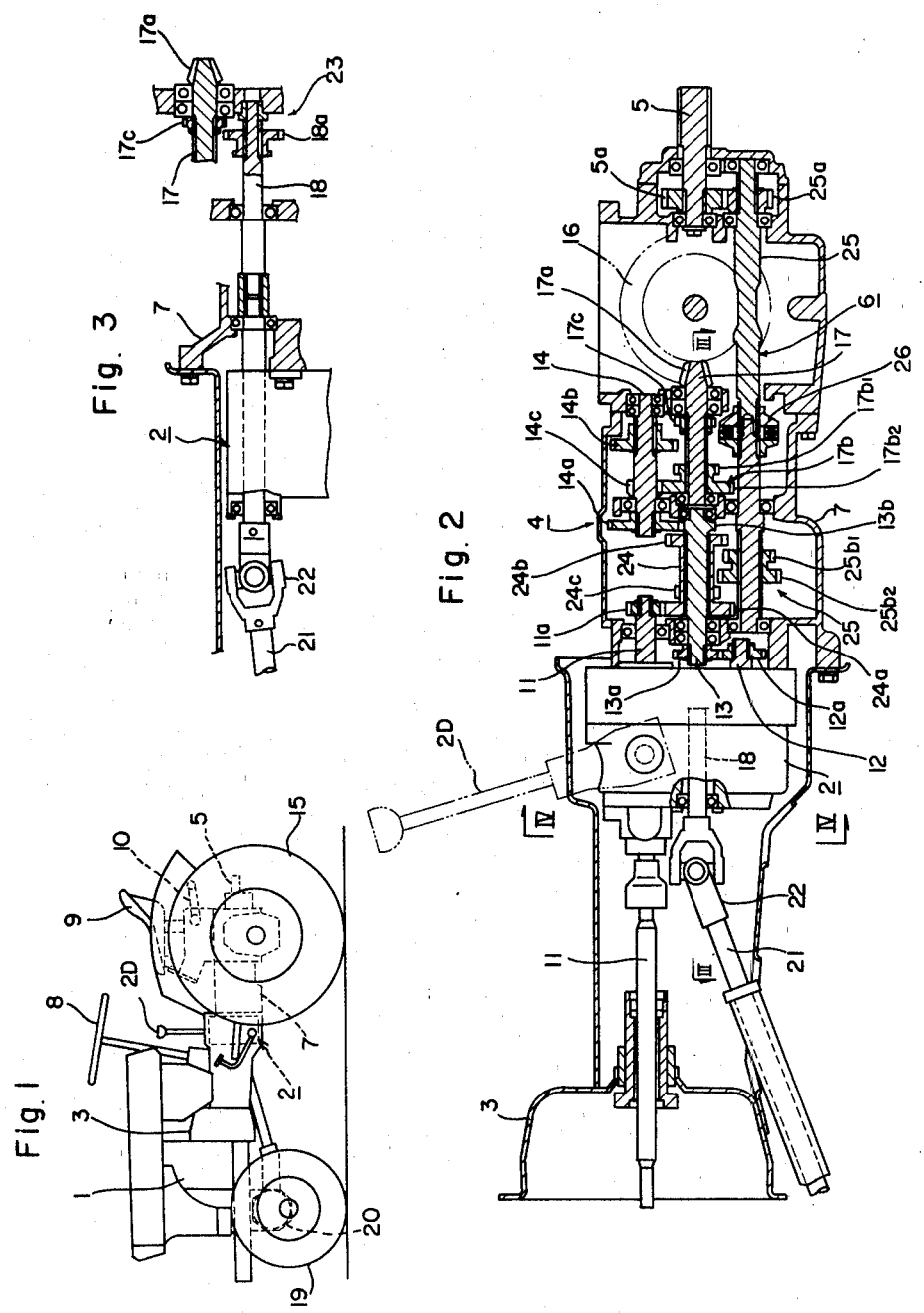

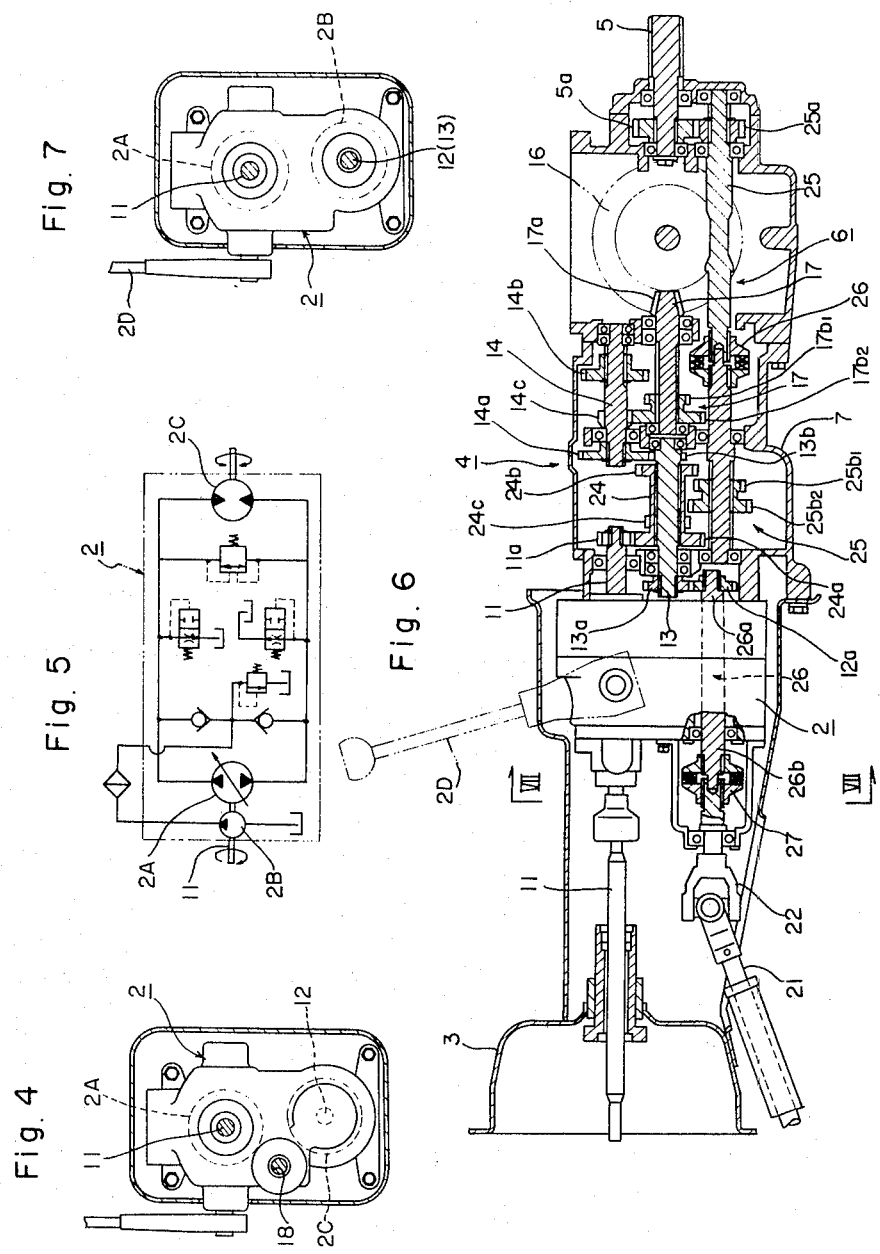

POWER TRANSMISSION SYSTEM FOR TRACTOR

BACKGROUND OF THE INVENTION

The present invention relates to a power transmission system for a tractor for example of the fourwheel drive type in which a hydraulic pump and a hydraulic motor are used.

Power transmission systems for tractors must be operable to transmit the power from an engine to a wheel drive mechanism and to a power takeoff (PTO) transmission mechanism for operating various working implements. It is essentially required for tractor works that the wheel transmission mechanism and the PTO transmission mechanism be independent of each other for the power transmission.

Accordingly conventional systems include a separate transmission path for transmitting the power from the engine to the PTO transmission mechanism before the power is delivered to the wheel transmission mechanism through a hydraulic motor. Thus the input shaft for the PTO transmission mechanism is provided under or on one side of the hydraulic pump and motor and the wheel transmission mechanism to bypass them, such that a transmission shaft for giving the engine power to the hydraulic pump delivers the power to the input shaft positioned therebelow by way of gears.

This arrangement has the drawback of being very bulky since the hydraulic motor and the bypass PTO input shaft are positioned below the hydraulic pump. The arrangement also involves the necessity of delivering the power from the hydraulic pump input shaft to the PTO input via gears.

This invention has overcome these drawbacks of the prior art.

SUMMARY OF THE INVENTION

An object of this invention is to provide a simple, compact and inexpensive power transmission system for a tractor in which hydraulic pump and motor are incorporated.

To fulfil this object, the power transmission system of this invention for a tractor comprises a hydraulic pump having a pump shaft extending therethrough for receiving power from an engine at its one end, a PTO transmission mechanism coupled to the other end of the pump shaft, a hydraulic motor to be driven by oil forced out from the hydraulic pump and having an output shaft positioned below and in parallel to the pump shaft, and a wheel transmission mechanism coupled to the output shaft.

Thus a much simpler and compacter power transmission system than conventional ones can be provided by merely utilizing the pump shaft of the hydraulic pump for directly transmitting the engine power to the PTO transmission mechanism.

Other objects and advantages of this invention will become apparent from the following description.

BRIEF DESCRIPTION OF THE DRAWINGS

FIG. 1 is an overall side elevation showing a tractor incorporating a power transmission system embodying this invention;

FIG. 2 is an enlarged side elevation in vertical section showing the main part of the same;

FIG. 3 is a view in section taken along the line III—III in FIG. 2;

FIG. 4 is a view in section taken along the line IV—IV in FIG. 2;

FIg. 5 is a diagram showing the main hydraulic circuit;

FIG. 6 is an enlarged side elevation in vertical section showing the main part of another embodiment; and FIG. 7 is a view in section taken along the line VII—VII in FIG. 6.

DESCRIPTION OF THE PREFERRED EMBODIMENTS

Embodiments of this invention will be described below with reference to the accompanying drawings.

FIG. 1 shows an agricultural tractor comprising, as arranged from front to rear, an engine 1, a housing 3 accommodating a clutch, a hydraulic stepless speed change mechanism 2 for giving a steplessly variable running speed including a slanting plate whose angle is altered to produce an altered output of working oil and steplessly vary the running speed, and a gear transmission case 7 housing a transmission mechanism 4 for a wheel system and another transmission mechanism 6 for a PTO shaft 5 for driving an attachment. Provided above the hydraulic stepless speed change mechanism 2 and the gear transmission case 7 are a steering wheel 8, a driver's seat 9 and a lift arm 10 for raising and lowering the attachment.

As shown in FIG. 5, the hydraulic stepless speed change mechanism 2 comprises a pump 2A of the axial plunger type and a charge pump 2B which are coupled to an input shaft 11 from the engine 1, and a motor 2C of the axial plunger type to be driven by the pump 2A. A speed change lever 2D extending upward from the pump 2A, when pivotally operated, alters the angle of the slanting plate of the pump 2A to thereby steplessly vary the number of revolutions of the motor 2C rotating in the positive or reverse direction, thus giving a steplessly variable forward or reverse running speed.

FIGS. 2 to 4 show the wheel transmission mechanism 4 in greater detail. The output shaft 12 of the motor 2C extending from the hydraulic stepless speed change mechanism 2 into the gear transmission case 7 carries a gear 12a meshable with a gear 13a on an input shaft 13 for the wheel system. A gear 13b mounted on the rear end of the input shaft 13 is meshable with a gear 14a on a first transmission shaft 14. A second transmission shaft 17 has a bevel gear 17a meshable with a differential gear 16 for rear wheels 15. The input shaft 13 is in alignment with the second transmission shaft 17. The second transmission shaft 17 is provided on its splined portion with a slidable shift gear 17b including gear portions 17b₁ and 17b₂ integral therewith and meshable with large and small gears 14b and 14c mounted on the first transmission shaft 14. A gear 17c on a rear portion of the second transmission shaft 17 is meshable with a gear 18a on a front wheel drive shaft 18 extending through, and projecting forward from, the hydraulic stepless speed change mechanism 2. The front wheel drive shaft 18 is coupled by a universal joint 22 to a front wheel transmission shaft 21 extending rearwardly upward from a gear case 20 for the front wheels 19.

The shift gear 17b on the second transmission shaft 17 is slidable axially thereof to selectively provide a first state in which the gear 17b meshes with the large gear 14b on the first transmission shaft 14 or a second state in which the gear 17b meshes with the small gear 14c, thus giving a low or high running speed in a changeover fashion.

The gear 18a on the front wheel drive shaft 18 is shiftable to provide a first state in which it meshes with the gear 17c on the second transmission shaft 17 or alternatively a second state in which it is out of engagement with the gear 17c. These two gears 18a and 17c constitute a clutch 23. When the tractor is adapted for four-wheel drive or rear-wheel drive selectively, the tractor is usable as a tractor of the four-wheel drive type when running in a paddy field or on a soft ground.

Alternatively a clutch may be provided at an intermediate portion of the front wheel transmission shaft 21.

The front wheel drive shaft 18 may comprise two separate segments, one extending through the hydraulic speed change mechanism 2 and the other positioned within the gear transmission case 7, with a coupling connecting these two segments together.

The PTO transmission mechanism 6 has the following construction. A tubular PTO input shaft 24 loosely mounted on the input shaft 13 of the wheel transmission mechanism 4 has a gear 24a meshable with a gear 11a on the input shaft 11 extending from the hydraulic stepless speed change mechanism 2 into the gear transmission case 7. The PTO shaft 5 carries a gear 5a meshable with a gear 25a on a transmission shaft 25 which is provided with a dog clutch 26 at its intermediate portion. A shift gear 25b mounted on a splined portion of the transmission shaft 25 is axially slidable thereof and includes gear portions $25b_1$ and $25b_2$ respectively meshable with large and small gears 24b and 24c formed on the tubular shaft 24. The shift gear 25b is shiftable to a first state in which it meshes with the large gear 24b of the tubular input shaft 24 or alternatively to a second state in which it meshes with the small ggear 24c to drive the PTO shaft 5 at a high or low speed selectively.

The front wheel drive shaft thus extending through, and projecting forward from, the hydraulic stepless speed change mechanism 2 serves to reduce the large space which otherwise would be needed for this shaft, rendering the power transmission system compact in its entirety.

Another embodiment of the power transmission system will be described with reference to FIGS. 6 and 7.

As will be apparent from a comparison between FIG. 6 and FIG. 2, the first and second embodiments differs in the position where the front wheel drive shaft is coupled to the transmission system. Throughout these drawings, like parts are referred to by like reference numerals.

With the second embodiment, the hydraulic motor 2C has an output shaft 26 projecting forward and rearward therefrom. A front wheel drive shaft 21 is connected to the forwardly projecting end 26b of the shaft 26 by a clutch 27 and a universal joint 22. The rearwardly projecting end 26a of the shaft 26 is coupled to the wheel transmission mechanism 4 as in the foregoing embodiment. With the exception of these differences, the other construction of the second embodiment is the same as the first and will not be described.

According to the present embodiment, a compact power transmission system is available only with the use of the modified output shaft 26 of the hydraulic pump. Although the front wheels are not speed-variable since the wheel transmission mechanism 4 is not utilized therefor unlike the first embodiment, the front and rear wheels can be driven at the same time under a specific condition.

When the front wheels are provided with speed change means disposed close thereto, the front and rear wheels can be driven in the same manner as in the first embodiment at all times.

We claim:

1. A power transmission system for a tractor comprising; a hydraulic stepless speed change mechanism composed of a hydraulic pump and a hydraulic motor disposed in vertical arrangement within a casing, said motor being adapted to be driven by oil forced out from said pump, said pump being provided with a pump drive shaft for receiving engine power at a front end portion thereof, said pump drive shaft having a rear end portion extending rearwardly through said casing, said motor being provided with a motor output shaft having a rear end portion extending rearwardly through said casing and parallel to said rear end portion of said pump drive shaft, a gear type power take-off transmission mechanism coupled to said rear end portion of said pump drive shaft, a drive transmission mechanism coupled to said rear end portion of said motor output shaft, said drive transmission mechanism comprising a gear speed-change mechanism to provide plural steps of output speed, a differential gear case housing a differential gear for driving rear wheels of the tractor and which is driven from said gear speed-change mechanism, said drive and power take-off transmission mechanisms each being disposed within a single gear transmission case arranged linearly between said case of the hydraulic stepless speed change mechanism and said differential gear case, and a front wheel drive shaft adapted to receive power from said gear speed change mechanism and extending forwardly through said case of said hydraulic stepless speed change mechanism.

2. A power transmission system as defined in claim 1, wherein said front wheel drive shaft is provided with a clutch means for connecting it to or disconnecting it from said gear speed change mechanism.

3. A power transmission system as defined in claim 1, wherein said power take-off transmission mechanism comprises a gear speed change mechanism to provide plural steps of power take-off speed.

4. A power transmission system as defined in claim 3, wherein said drive transmission mechanism comprises an input shaft connected to said rear end portion of said motor output shaft via gears and said power take-off transmission mechanism comprises a tubular input shaft mounted for free rotation on said input shaft and connected to said rear end portion of said pump drive shaft via gears.

5. A power transmission system as defined in claim 2, 3 or 4, wherein said hydraulic pump comprises an axial plunger variable delivery pump and said hydraulic motor comprises an axial plunger motor.

* * * * *